United States Patent
Al-Darra (10) Patent No.: US 11,608,896 B2
(45) Date of Patent: Mar. 21, 2023

(54) MULTIPLE COMPONENT SEAL ASSEMBLY

(71) Applicant: A.W. CHESTERTON COMPANY, Groveland, MA (US)

(72) Inventor: Pierre Aouni Alfons Al-Darra, Eching (DE)

(73) Assignee: A.W. CHESTERTON COMPANY, Groveland, MA (US)

( * ) Notice: Subject to any disclaimer, the term of this patent is extended or adjusted under 35 U.S.C. 154(b) by 2 days.

(21) Appl. No.: 16/741,402

(22) Filed: Jan. 13, 2020

(65) Prior Publication Data
US 2020/0224770 A1 Jul. 16, 2020

Related U.S. Application Data

(60) Provisional application No. 62/791,530, filed on Jan. 11, 2019.

(51) Int. Cl.
*F16J 15/34* (2006.01)
*F16J 15/3276* (2016.01)

(52) U.S. Cl.
CPC ....... *F16J 15/3412* (2013.01); *F16J 15/3276* (2013.01)

(58) Field of Classification Search
CPC .... F16J 15/00; F16J 15/16; F16J 15/50; F16J 15/52; F16J 15/34; F16J 15/3412; F16J 15/3424; F16J 15/3268; F16J 15/3272; F16J 15/3276; F16J 15/32; F16J 15/3204
USPC .......................................................... 277/371
See application file for complete search history.

(56) References Cited

U.S. PATENT DOCUMENTS

| | | | |
|---|---|---|---|
| 4,635,945 A * | 1/1987 | Beck | F16J 15/166 277/530 |
| 5,306,021 A | 4/1994 | Morvant | |
| 8,985,590 B2 * | 3/2015 | Liang | B62D 55/0887 277/589 |
| 9,010,725 B2 * | 4/2015 | Hunter | F16K 3/0227 251/214 |
| 2004/0012156 A1 | 1/2004 | Cobb | |
| 2015/0226338 A1 | 8/2015 | Hunter | |

FOREIGN PATENT DOCUMENTS

WO 00/25048 A1 5/2000

OTHER PUBLICATIONS

International Search Report and Written Opinion, PCT/US2020/013356, dated Jun. 15, 2020, 16 pages.

* cited by examiner

*Primary Examiner* — Nathan Cumar
(74) *Attorney, Agent, or Firm* — Nelson Mullins Riley & Scarborough LLP; Anthony A. Laurentano (57) ABSTRACT

A sealing assembly that includes first, second and third sealing elements, where the first sealing element is disposed between the second and third sealing elements. The sealing elements are shaped in a complementary manner so that the sealing elements when assembled nest together. The sealing elements also have different hardness values associated therewith.

14 Claims, 4 Drawing Sheets

MULTIPLE COMPONENT SEAL ASSEMBLY

RELATED APPLICATION

The present application claims priority to U.S. provisional patent application Ser. No. 62/791,530, filed on Jan. 11, 2019, and entitled Multiple Component Seal Assembly, the contents of which are herein incorporated by reference.

BACKGROUND OF THE INVENTION

The present invention relates to sealing assemblies for mechanical devices, and more specifically relates to a sealing assembly for use with a mechanical apparatus that has a reciprocating shaft.

Conventional seal assemblies are employed in a wide variety of environments and settings, such as for example, in connection with various mechanical apparatuses, to provide a fluid-tight seal. The sealing assemblies are usually positioned about a rotating shaft or rod that is mounted in and protrudes from a stationary mechanical housing.

The seal assemblies are employed in a wide variety of mechanical apparatuses, such as for example valves and pumps, to provide a pressure-tight and fluid-tight seal relative to the movable shaft or rod of the apparatus. The sealing assembly is usually positioned about a rotating or reciprocating shaft or rod that is mounted in and protruding from a stationary housing. The sealing assembly is usually mounted in a gland structure which can be secured to a housing of the apparatus at the shaft exit, thus preventing the loss of pressurized process fluid from the housing.

A drawback of conventional sealing assemblies is that as the movable shaft or rod ages, the radially outer face of the shaft (i.e., the face of the shaft presented to the sealing surface of the seal) may become inconsistent, pitted, pocked, damaged, or otherwise made uneven. If the sealing surface of the sealing assembly cannot conform to the uneven surface of the shaft, the seal assembly is not capable of maintaining a fluid tight seal with the shaft.

SUMMARY OF THE INVENTION

The present invention is directed to a multiple sealing element sealing assembly suitable for use with a stationary mechanical apparatus. The sealing assembly can be a mechanical sealing assembly for use with rotating shafts or a hydraulic sealing assembly for use with a reciprocating rod. According to a preferred embodiment, the sealing assembly is a hydraulic sealing assembly for use with a reciprocating rod. The sealing assembly includes an intermediate sealing element and a pair of end sealing elements disposed on either axial side of the intermediate sealing element. The pair of end sealing elements are configured to have end regions adjacent to the intermediate sealing element that have surface features that are complementary in shape to the respective end regions of the intermediate sealing element. This allows the sealing element to nest together to form the sealing assembly.

The sealing elements of the sealing assembly of the present invention also have hardness or Shore values that are different relative to each other. According to one practice, the hardness values of the sealing elements decrease in the axial outboard direction or increase in the axial inboard direction.

The sealing assembly of the present invention is for use in stationary equipment that has a gland and a movable rod, the sealing assembly comprising a plurality of sealing elements for seating within a groove formed in the gland of the stationary equipment. The sealing elements include a first annular intermediate sealing element having a main body having a first end region and an opposed second end region, wherein the main body has a radially inner wall surface and an opposed radially outer wall surface, and wherein the first end region of the main body has opposed first and second slanted wall surfaces that transition to a relatively flat end surface and wherein the second end region includes first and second opposed flared leg portions having a recess formed therebetween, and wherein the radially inner wall surface of the main body has a rib formed thereon. The sealing assembly also includes a second annular sealing element disposed adjacent to the first end region of the first intermediate sealing element, wherein the second sealing element has a main body having a first end region terminating in a relatively flat end surface and an opposed second end region that is disposed adjacent to the first end region of the first intermediate sealing element, wherein the second end region includes a recess having a shape that is complementary to the shape of the first end region of the first intermediate sealing element. Additionally, the sealing assembly includes a third annular sealing element disposed adjacent to the second end region of the first intermediate sealing element, wherein the third sealing element has a first end region disposed adjacent to the second end region of the first intermediate sealing element and an opposed second end region, wherein the first end region of the third sealing element has a shape that is complementary to the shape of the recess formed in the second end region of the first intermediate sealing element.

According to the present invention, each of the first and second slanted wall surfaces of the first end region of the first intermediate sealing element forms an angle. Further, the angle can preferably be about 45 degrees. Further, each of the first and second flared leg portions of the first intermediate sealing element has a sealing edge associated therewith, wherein the width of the first intermediate sealing element as measured at the rib and at the sealing edges of the first and second flared leg portions is greater than a width of each of the second and third sealing elements. Still further, either or both of the sealing edges has a slanted surface associated therewith and is configured to extend upwardly relative to an end plane that is orthogonal to a center axis of the first intermediate sealing element. Either or both of the slanted surfaces forms an angle relative to the end plane of about 10 degrees.

According to the present invention, the recess of the first intermediate sealing element comprises a first substantially circular portion and a second axially outer portion adjacent to an entrance to the recess that has generally flat opposed axially extending first and second wall portions. The first end region of the third sealing element has a substantially circular shape and the second end region has a stem-like shape having opposed first and second axially extending wall surfaces.

The recess of the first intermediate sealing element comprises a first substantially circular portion and a second axially outer portion adjacent to an entrance to the recess that has generally flat opposed axially extending first and second wall portions, whereby the first substantially circular region of the recess is complementary in shape to the substantially circular first end region of the third sealing element and the second axially outer portion of the recess is complementary in shape to at least a portion of the second end region of the third sealing element.

The recess of the second end region of the second sealing element includes opposed first and second slanted wall portions and a relatively flat floor, wherein when assembled the flat end surface of the first intermediate sealing element contacts the floor of the recess of the second sealing element and the first and second slanted wall surfaces of the first intermediate sealing element contact, respectively, the first and second slanted wall portions of the second sealing element.

Yet further, each of the sealing elements has a hardness value associated therewith, and wherein the hardness values of the sealing elements differ relative to each other. The first intermediate sealing element has a first hardness value associated therewith, the second sealing element has a second hardness value associated therewith, and the third sealing element has a third hardness value associated therewith, wherein the first, second and third hardness values differ relative to each other, and wherein the hardness values of the sealing elements decrease in an axial direction from the second sealing element to the third sealing element.

The sealing assembly has a first length and the groove of the gland has a second length, wherein the first length is greater than the second length. Also, each each of the slanted surfaces forms an angle relative to the end plane.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

The present invention provides a sealing assembly for providing sealing on a movable shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

The term "shaft" is intended to refer to any suitable device in a mechanical system to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and/or components of a mechanical sealing assembly that are disposed proximate to the mechanical system employing the seal assembly. As such, the components of the sealing assembly are mounted within the equipment or are disposed the deepest within or closest to the equipment (e.g., inboard). Conversely, the term "axially outer" as used herein refers to the portion of stationary equipment and a seal assembly distal from the mechanical system (e.g., outboard).

The term "radially inner" as used herein refers to the portion of the sealing assembly or associated components that are proximate to a shaft. Conversely, the term "radially outer" as used herein refers to the portion of the seal assembly or associated components that are distal from the shaft.

The terms "stationary equipment" and/or "static surface" as used herein are intended to include any suitable stationary structure housing a shaft or rod to which a seal having a gland is secured. Those of ordinary skill will also recognize that the gland assembly can form part of the mechanical seal or part of the stationary equipment.

Figure 1:
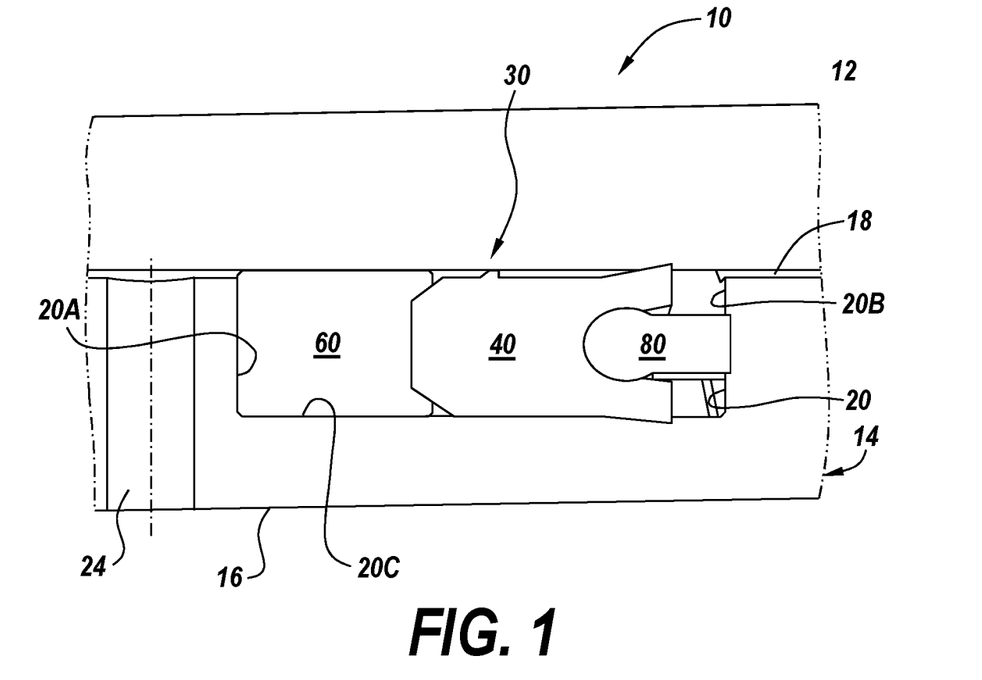
FIG. 1 is a cross-sectional view of a conventional mechanical apparatus employing the sealing system of the present invention.
Figure 2:
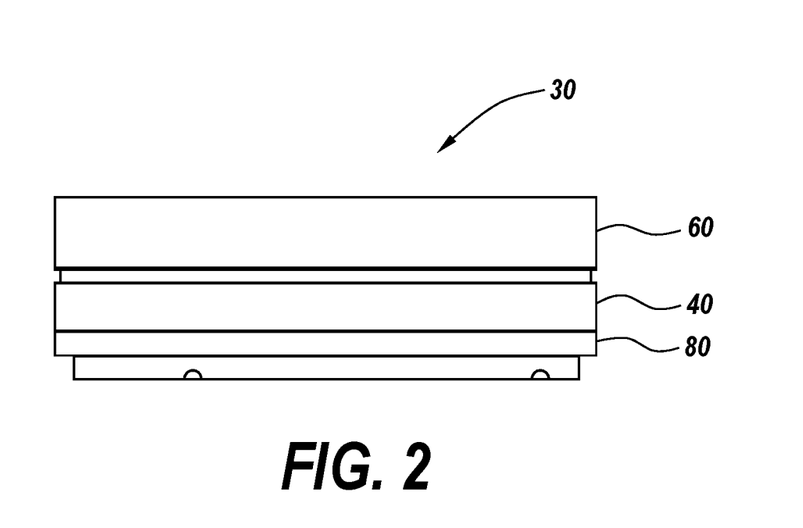
FIG. 2 is a an isometric view of the assembled sealing assembly of the present invention.
Figure 3:
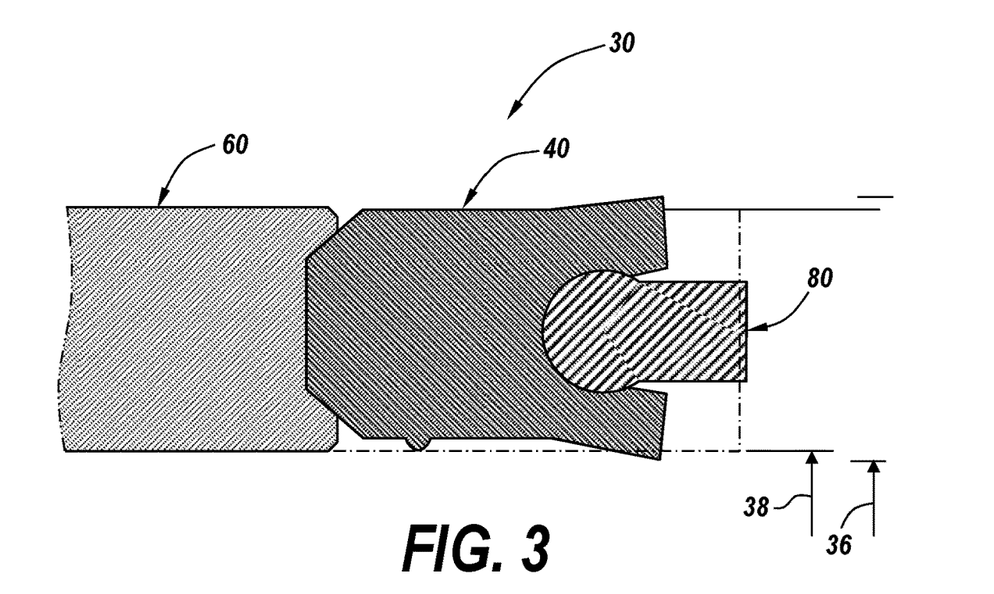
FIG. 3 is a cross-sectional view of the sealing assembly of the present invention.

The present invention is directed to a sealing assembly for sealing against a housing of a stationary equipment having a movable shaft or rod. The sealing assembly can be a mechanical assembly for use with a rotating shaft or a hydraulic sealing assembly for sue with a reciprocating rod. According to a preferred embodiment, the sealing assembly is a hydraulic sealing assembly, although those of ordinary skill will readily recognize that the sealing assembly 30 of the present invention an be used with any suitable mechanical device having a gland. The sealing assembly of the present invention includes multiple sealing elements that are configured to seat together to form the sealing assembly. As illustrated in FIGS. 1-3, the present invention is directed to a sealing system 10 that includes a gland 14 that is concentrically disposed about a movable shaft or rod 12. The rod 12 can form part of any selected stationary equipment, such as a pump or a valve, that requires sealing structure to form a fluid tight seal with the shaft. The gland 14 can be secured or mounted to the housing of the equipment by known fastening techniques. The gland can have any selected configuration depending upon the specific type of equipment that is employed, as is known in the art. For example, in the illustrated example, the gland 14 includes a housing 16 that includes an inner surface 18 that has a groove 20 formed therein. The gland housing may also include a fluid passage 24 for introducing a selected fluid, such as a cooling or barrier fluid, to the shaft surface. The gland groove 20 can be sized and configured for seating the sealing assembly 30 of the present invention. The sealing assembly 30 can include multiple separate and discrete sealing elements or components 40, 60, 80 that can be coupled together and seat within the groove 20. The groove has a pair of opposed side walls 20A, 20B and a floor portion 20C. The sealing assembly 30 fits snugly within the groove 20 such that the sealing components contact the floor 20C of the groove as well as the opposed ends 20A, 20B to form a fluid tight seal.

The sealing elements also help form a fluid tight seal against the rod 12 so as to keep the process fluid of the mechanical apparatus contained therein. The rod 12 can be a rotating shaft or a reciprocating shaft depending upon the type of mechanical apparatus that is employed.

The sealing assembly 30 of the present invention can include any selected number of separate, discrete sealing elements, and preferably includes three sealing elements 40, 60, 80. The sealing elements are configured so as to be complementary in shape relative to each other such that the sealing elements when assembled in the groove 20 nest together to form the sealing assembly 30. As shown in FIGS. 1-4, the sealing assembly 30 includes a first annular intermediate sealing element 40, a second annular end or inner sealing element 60, and a third annular end or outer sealing element 60. The illustrated intermediate sealing element 40 provides for the sealing against the rod 12 as described in further detail below. The sealing element 40 includes a main body 42 that has a first axial tapered end 44 and a second flared opposed axial end 46. The axial tapered end 44 has a pair of slanted wall face surfaces 48A, 48B that transition to a flat axially outermost surface 50. The inner or shaft side slanted wall surface 48A is smaller in length than the outer groove side slanted wall surface 48B. The difference in lengths of the slanted walls is a result of the inner radial width portion or half 51A of the sealing element 40 about the centerline 51 being smaller than the radial outer portion or half 51B of the sealing element. The flat outermost surface 50 is adapted to seat against or contact the side wall 20B of the groove while also contacting the floor 20C of the groove when mounted therein. The tapered surfaces 48A, 48B are angled relative to the radially inner surface 42A and the radially outer surface 42B to form angles 49A, 49B, respectively. The angles are preferably about 45 degrees with regard to the axial direction, and thus match or complementary in shape to the adjacent end of the sealing element 20. The current angle is employed to allow the sealing elements to sufficiently nest together during assembly and use.

Figure 4:
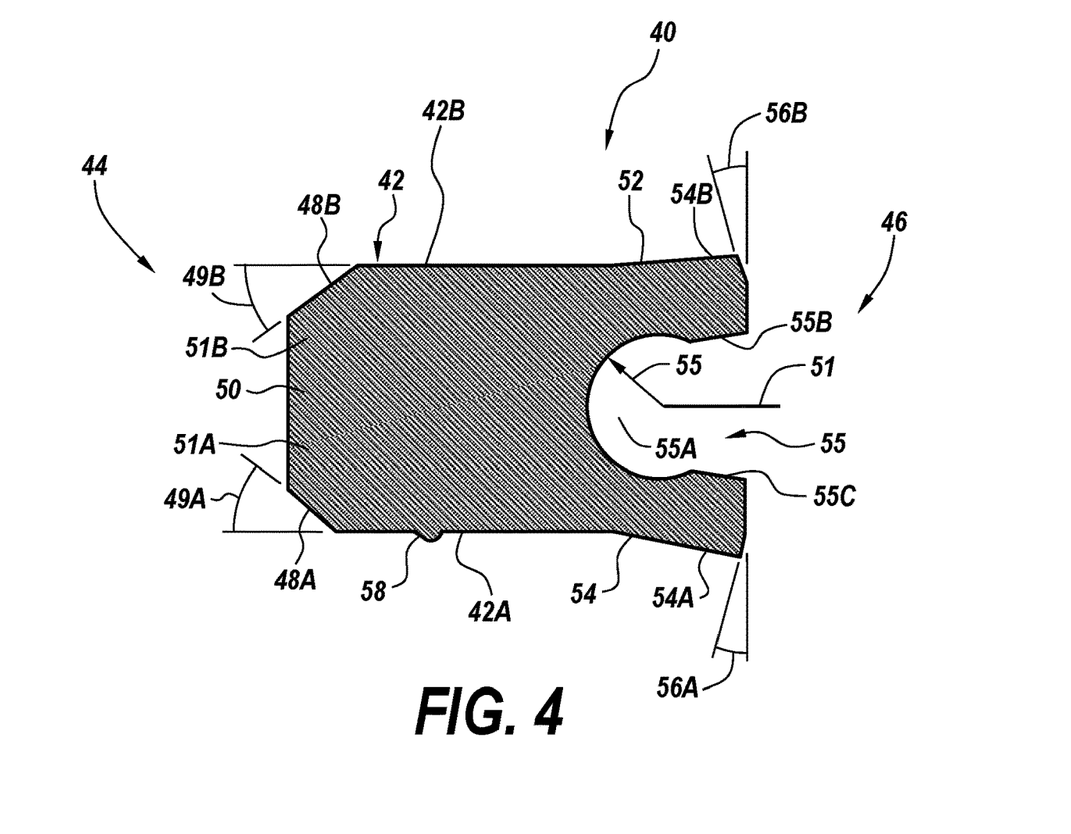
FIG. 4 is a cross-sectional view of the intermediate sealing component of the sealing assembly according to the teachings of the present invention.

The illustrated intermediate sealing element 40 can be composed of any suitable material having any selected hardness. According to one practice, the intermediate sealing element 40 can be composed of an elastomeric material having a hardness or Shore A value of about 95. Those of ordinary skill in the art will readily recognize that other types of sealing elements composed of different materials can be employed, such as NBR, FKM, and FFKM. The skilled artisan will readily be able to determine the suitable hardness range based on the environment of the equipment, application specifics, the mating surface of the rod in terms of age and condition and contact surface area, fluid and lubricating types and expected behavior, rod speed, temperature, pressure, and the like.

With further reference to FIGS. 1, 3 and 4, the opposed second end 46 of the sealing element 40 has a flange or flared section that includes a pair of opposed leg portions 52, 54 that bounds and has formed therein a groove 55. The groove 55 is preferably shaped in a manner that is complementary in shape to a mating end of the third annular sealing element 80. The groove has a first portion 55A that is substantially or generally circular in shape and has a radius 55D associated therewith. The skilled artisan will readily be able to determine the suitable and suitable radius range based on the environment, application specifics, mating surface of the rod in terms of age and condition and contact surface area, fluid and lubricating types and expected behavior, rod speed, temperature, pressure, and the like. The groove 55 also has a second axially outer portion associated therewith adjacent an entrance to the recess that has generally flat opposed axially extending wall portions 55B, 55C. The flared end section 46 of the intermediate sealing element 40 has a radial width 36 at the widest portion thereof that extends beyond the depth of the groove 20 and the width 38 of the sealing element 60 so as to contact the rod 12 when mounted therein. The radially inner (e.g., shaft side) leg 54 has a radially inner sealing edge 54A for dynamically contacting and hence sealing against the rod 12. The radially outer leg 52 has a radially outer sealing edge 54B for statically sealing against the floor 20C of the gland groove 20. Further, the sealing edges 54A, 54B each include a slanted surface that are formed or configured to extend upwardly relative to an end plane or axis that is orthogonal to the center axis 51. The slanted surfaces of the sealing edges 54A, 54B relative to this plane form on the radial inner end an angle 56A and on the radially outer end an angle 56B. The angles 56A and 56B can be any selected angle and can be the same or different angles. According to a preferred embodiment, the angles 56A, 56B are the same and are about 10 degrees. The skilled artisan will readily be able to determine the suitable radius range based on the environment of the equipment, application specifics, mating surface of the rod in terms of age and condition and contact surface area, fluid and lubricating types and expected behavior, rod speed, temperature, pressure, and the like. The relatively shallow or small angles causes a comparatively small lubricating film to arise on the edges 52A, 54A, and helps prevent any leakage from occurring.

The illustrated sealing element 40 also includes an intermediate section that a surface feature, such as the nub or rib 58, that extends radially outwardly from an inner axial surface 42A. The rib 58 extends outwardly from the inner surface 42A a sufficient distance so as to extend outwardly from the groove 20 when the sealing element 40 is mounted therein so as to contact the rod 12. In this configuration, the intermediate sealing element 40 at the rib 58 location is wider than the other sealing elements 60, 80 as well as the groove 20. The rib is also sized so as prevent the radially inner surface 42A of the sealing element 40 from contacting the rod 12 over a large contact area. This is important since if the sealing assembly 30 is exposed to high pressures, the smaller contact area of the rib 58 helps prevent excessive friction and thus heat generation.

With reference to FIGS. 1-3 and 5, the sealing assembly 30 of the present invention also includes a second annular sealing element 60 that helps support and guide the first intermediate sealing element 40. The illustrated sealing element 60 includes a main body 62 that includes an inner radial surface 62A and an outer radial surface 62B. The sealing element 60 also includes a first axial outer end 64A and an opposed second end 64B. The first end 64A terminates in a relatively flat surface 68 that is configured to abut against and hence contact a side wall of the groove 20, such as for example, the sidewall 20B. The opposed second end 64B has a recess 70 formed herein and includes a pair of slanted side walls 72A, 72B and a floor 72C 70. The recess 70 is configured to be complementary in shape to and hence mate with the tapered end 44 of the intermediate sealing element 40. Further, the slanted side walls 72A, 72B have generally the same angle as the slanted walls 48A, 48B of the intermediate sealing element 40. The main body 62 has a relatively flat radially inner wall 62A and an opposed relatively flat radially outer wall 62B such that the inner wall and the outer wall define a diameter of the second annular sealing element 60.

Figure 5:
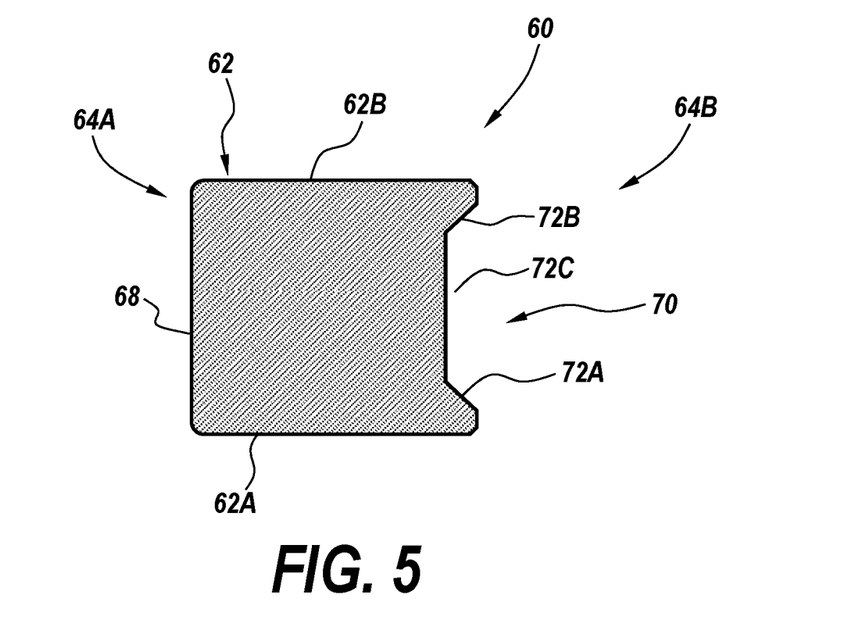
FIG. 5 is a cross-sectional view of the second end sealing component of the sealing assembly according to the teachings of the present invention.

The second sealing element 60 has a hardness or Shore A value that is higher that the intermediate sealing element 40. As such, the sealing element 60 helps prevent the intermediate element 40 from radially deforming when the sealing elements are assembled together. Specifically, the difference in hardness values helps prevent the intermediate sealing element 40 from lying flatly on the rod 12 in case of high pressure conditions, which would lead to increased friction. Moreover, the end sealing element 60 prevents an extrusion of material, such as the intermediate sealing element 40, into a gap or clearance formed between the rod 12 and the gland 14 at high pressures. Finally, if the rod 12 is not properly guided by any corresponding bearings (not shown), or the bearings have acquired excessive play due to ageing or wear, the second end sealing element 60 acquires part of the guiding function. Since this auxiliary guidance is provided adjacent to the intermediate sealing element 40, the longevity of the intermediate sealing element 40 is enhanced, and hence the sealing function is increased in case of improperly guided (e.g., eccentric) rods 12. According to the present invention, the end sealing element 60 has a hardness or Shore D value of about 80. Those of ordinary skill will readily be able to determine the appropriate hardness or hardness range based on the types of materials used in the sealing element as well as ensuring that the sealing element guides and prevents extrusion of the intermediate sealing element 40. Further, the sealing element 60 can be composed of any suitable material, such as for example from a polyether ether ketone (PEEK) material, a polyamide (PA) material, POM, or the like.

Further, the purpose of the end sealing element 60 is not primarily to provide a sealing function relative to the rod 12, since no portion thereof extends radially inward as far as the sealing edge 54 of the intermediate sealing element 40. Instead, the end sealing element 60 mainly serves to provide structural support to the intermediate sealing element 40 and to provide guidance as well.

With reference to FIGS. 1-3 and 6-8, the sealing assembly 30 of the present invention includes a third annular sealing element 80. The sealing element 80 is disposed on an axial end of the intermediate sealing element 40 that is opposite the end adjacent to the second end sealing element 60. The sealing element 80 has a main body 82 that includes a first end portion 84A and an opposed end portion 84B. The first end portion 84A is generally circular in shape, and the associated radius can be easily determined or selected by one of ordinary skill in the art based on the type of material used as well as based on the specific mating or nesting configurations of the adjacent end regions. The first end portion has a size or width that is greater than the size or width of the second end portion 84B. The second end portion 84B forms an extension of the circular end portion 84A and has a pair of opposed relatively flat wall portions 88A, 88B that terminates in a relatively flat end face or surface 90.

Figure 6:
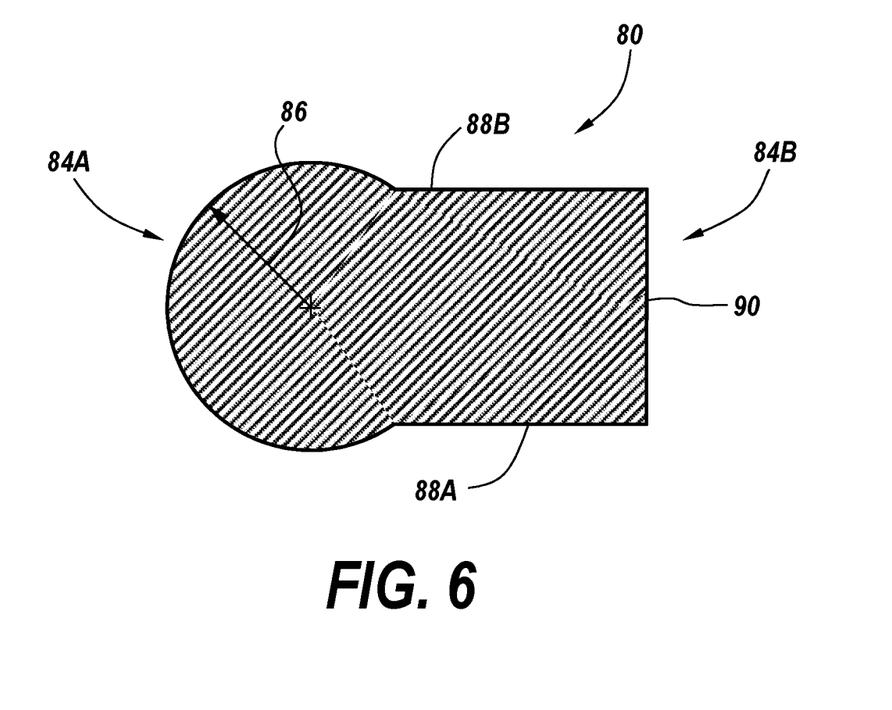
FIG. 6 is a cross-sectional view of the opposed third end sealing component of the sealing assembly according to the teachings of the present invention.

The circular end portion 84A is sized and configured to seat within the circular portion 55A of the groove of the intermediate sealing element 40. Specifically, the circular end portion 84A and the groove portion 55A are complementary in shape so as to receive and seat the circular end portion 84A of the third annular sealing element 80. When the circular end portion 84A is seated within the groove 55 of the intermediate sealing element 40, the mating assembly and engagement of the sealing components, and specifically the circular end portion 84A helps prevents the leg portions 52, 54 from collapsing during negative pressure conditions. Moreover, the axial length of the third end sealing element 80 is designed such that the entire sealing assembly 30 has a total extension in an axial direction which is slightly longer than the length of the groove 20 formed in the gland 14. Accordingly, when the sealing assembly 30 is mounted within the groove 20 in the gland 14, the sealing element 80 is compresses or pushed into a frictional fit mechanical sealing relationship with the groove 20. Further, the circular end portion 84A is pushed into the recess 55 of the intermediate sealing element 40, thereby forcing the radial inner and outer legs 52, 54 apart, such as to increase the contact pressure between the sealing edges 54A, 54A and the rod 12 and the gland 14, and thus increasing the overall sealing capability of the intermediate sealing element 40. Moreover, since the smaller width stem-line end portion 84B of the sealing element 80 abuts against the axial end wall 20B of the groove 20 in the gland 14, the sealing assembly 30 does not suffer from axial movement, in particular in cases where the pressure on opposite sides of the sealing element 80 is reversed during the working cycle of the rod 12 or the like, where the sealing assembly 30 is employed. As such, the circular end portion 84A of the sealing element 80, when mounted within the recess 55 of the intermediate sealing element 40, forms a frictional fit from the direct contact of the entire circular end portion 84A of sealing element 80 with the circular recess 55 of the intermediate sealing element, so as to be able to prevent the first and second flared leg portions from collapsing during a negative pressure condition The third annular sealing element 80 has a hardness value that is preferably lower than that of the intermediate sealing element 40 and the second end sealing element 60. For example, the sealing element 80 can be made from an elastomer material and has a hardness or Shore A value of between about 60 and about 85. The skilled artisan will readily be able to determine the suitable hardness values of the third sealing element based on the environment, application specifics, mating surface of the rod in terms of age and condition and contact surface area, fluid and lubricating types and expected behavior, rod speed, temperature, pressure, and the like. As such, and when converting the Shore A values to Shore D values according to well-known techniques, the hardest seal or the seal with the higher hardness value is the second end sealing element 60 (Shore D of 80); the intermediate sealing element 40 is the next hardest and has a Shore A value of 95 (e.g., a Shore D value of about 46); and the softest or least hard sealing element is sealing element 80 that has a hardness or Shore A value of 85 (e.g., a Shore D value of 38). The third annular sealing element 80 preferably has the lowest hardness value so as to provide the flared leg portions 52, 54 and the associated sealing edges 54A, 54B with the enhanced ability to seal against the rod 12. This occurs since the third sealing element 80 is more resilient relative to the other sealing elements.

Figure 7:
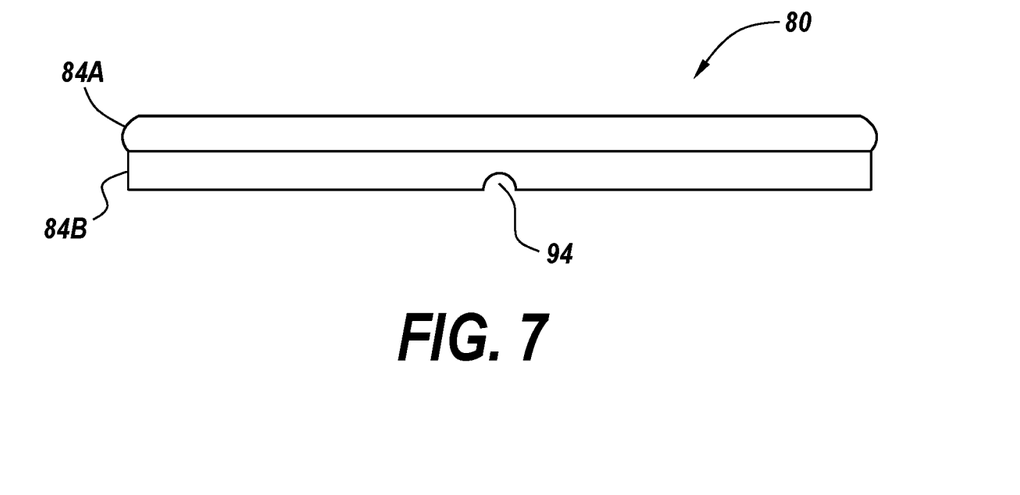
FIG. 7 is a perspective view of the third annular sealing element of FIG. 2 showing a pressure opening in isolation according to the features of the present invention.
Figure 8:
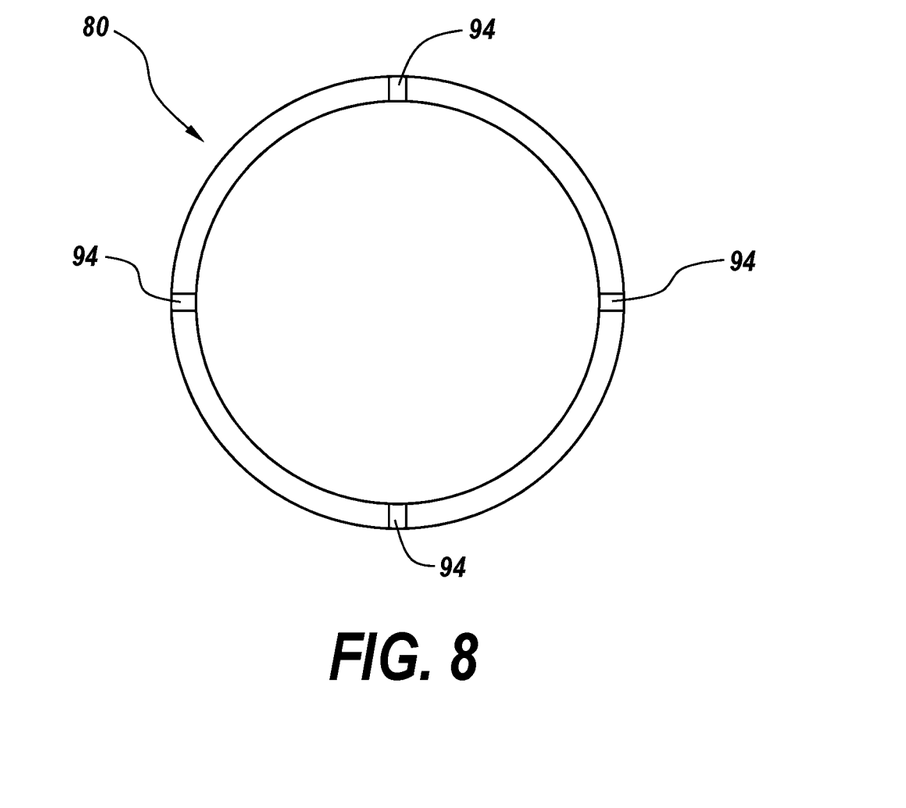
FIG. 8 is a top view of the third annular sealing element of FIG. 2 according to the teachings of the present invention.

The illustrated stem-like end portion 84B of the sealing element 80 can also have formed therein one or more pressure openings 94 for equalizing pressure on either side of the end portion 84B during use. According to one embodiment, the sealing element 80 can include a plurality of spatially separated pressure openings 94 that are distributed about, and preferably equally about, the annular circumference of the end portion 84B. The pressure openings 94 preferably extend between the wall surfaces 88A, 88B of the end portion 84B. The pressure openings 94 allow for the equalization of pressure on the radially inner and radially outer sides of the end portion 84B. The equalization of pressure effectively prevents unwanted deformation of the end portion 84B of the sealing element 80 that can otherwise occur due to a difference in pressure on the radially inner and radially outer sides of the end portion 84B.

According to another practice of the invention, if the mechanical apparatus employing the gland 14, rod 12, and sealing assembly 30 of the present invention is processing an aggressive material, then either or both of the end sealing elements 60, 80 can be formed from an appropriate material, such as for example from a fluoroelastomer material such as FKM or FFKM, or a hydrogenated acrylonitrile butadiene rubber (H-NBR), In operation, the sealing elements 40, 60, and 80 and assembled prior to insertion within the groove 20 of the gland 14. The circular end portion 84A of the sealing element 80 is inserted within the groove or recess 55 formed in the end portion 46 of the intermediate sealing element 40. The recess 55 and specifically the recess portion 55A is shaped in a complementary manner to the end portion 84A of the sealing element 80. As such, the end portion 84A seats within the recess and is in intimate facing contact with nearly the entire surface with the recess portion 55A. The complementary shaped surfaces provide for a snug sealing fit within the groove 20.

The recess 70 of the sealing element 60 is also complementary in shape to the end portion 44 of the sealing element 40. As such, the end portion 44 seats within and is in intimate facing contact with nearly the entirety of the recess 70. Specifically, the end face 50 of the intermediate sealing element 40 contacts the floor 72C of the groove 70, and the angled surfaces 48A, 48B contact the slanted surface 72A, 72B, respectively, of the groove 70. The assembled sealing elements 40, 60, 80 form the sealing assembly 30. The sealing assembly 30 is then mounted within the groove 20. Since the axial length of the sealing assembly 30 is longer than the length or width of the groove 20, the sealing assembly 30 is hence squeezed into the groove 20 and hence is retained therein by a frictional fit. When mounted within the groove 20, the flat outer surface 60 of the sealing member 60 contacts the wall 20A of the groove, and the flat end surface 90 of the sealing member 80 contacts the wall 20B opposite the second end sealing member 60. Likewise, the wall 42B and the flange 52, 54B of the intermediate sealing element contact the floor 20C of the groove and hence provide a fluid seal. The side wall 62B also contacts the floor 20C. With regard to the rod 12, the rib 58 and the flange 54A contact the rod and create a fluid tight seal.

The angles 56A and 56B of the flared leg portions are configured to form a relatively shallow angle to cause a comparatively small lubricating film to arise on the edges 54A, 54B, and thus helps prevent any leakage from occurring. Further, the intermediate sealing element 40 also includes a rib 58 for contacting the rod 12, in addition to the sealing edge 54A, to create a fluid tight seal. The specific contact regions of the sealing element 40 are significantly reduced relative to conventional seal assemblies so as to avoid large areas of the seal (e.g., inner surface 42A) from contacting the shaft. Specifically, the rib 58 is sized so as prevent the radially inner surface 42A of the sealing element 40 from contacting the rod 12 over a large contact area. This is important since if the sealing assembly 30 is exposed to high pressures, the smaller contact area of the rib 58 helps prevent excessive friction and thus heat generation from occurring.

When the circular end portion 84A of the third annular sealing element 80 is seated within the groove 55 of the intermediate sealing element 40, the mating assembly and engagement of the sealing components, and specifically the circular end portion 84A with the circular portion 55A of the groove helps prevent the leg portions 52, 54 from collapsing during negative pressure conditions hat may be applied towards the outboard end of the sealing assembly.

The sealing elements are also configured such that the hardness of the sealing elements decreases in the axial direction towards the outboard end of the sealing assembly. That is, the sealing element 60 has the highest hardness value, the intermediate sealing element 40 has the next highest hardness value, and then the sealing element 80 has the lowest hardness value. Specifically, the axial end sealing element 60 has a hardness or Shore value that is higher that the intermediate sealing element 40. As such, the second annular sealing element 60 helps prevent the intermediate sealing element 40 from radially deforming when the sealing elements are assembled together. Specifically, the difference in hardness values helps prevent the intermediate sealing element 40 from lying flatly on the rod 12 in case of high pressure conditions, which would lead to increased friction. Moreover, the second annular sealing element 60 helps prevent an extrusion of material, such as the intermediate sealing element 40, into a gap or clearance formed between the rod 12 and the gland 14 at high pressures.

The illustrated stem-like end portion 84B of the sealing element 80 can also have formed therein one or more pressure openings 94 for equalizing pressure on either side of the end portion 84B during use. The pressure openings 94 allow for the equalization of pressure on the radially inner and radially outer sides of the end portion 84B. The equalization of pressure effectively prevents unwanted deformation of the end portion 84B of the sealing element 80 that can otherwise occur due to a difference in pressure on the radially inner and radially outer sides of the end portion 84B.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A sealing assembly for use in stationary equipment having a gland and a movable rod, the sealing assembly comprising a plurality of sealing elements for seating within a groove formed in the gland of the stationary equipment, the plurality of sealing elements including a first annular intermediate sealing element having a main body having a first end region and an opposed second end region, wherein the main body has a relatively flat, non-sloped radially inner wall surface and an opposed relatively flat, non-sloped radially outer wall surface, wherein the first end region of the main body has opposed first and second slanted wall surfaces that transition to a relatively flat end surface and wherein the second end region includes first and second opposed flared leg portions that extend axially outwardly from the relatively flat, non-sloped inner and outer wall surfaces and has a recess formed therebetween, and wherein the flared leg portions are separate and distinct from the relatively flat, non-sloped surfaces and wherein the relatively flat radially inner wall surface of the main body has a rib formed thereon, a second annular sealing element disposed adjacent to the first end region of the first intermediate sealing element, wherein the second sealing element has a main body having a first end region terminating in a relatively flat end surface and an opposed second end region that is disposed adjacent to the first end region of the first intermediate sealing element, wherein the second end region includes a recess having a shape that is complementary to the shape of the first end region of the first intermediate sealing element, wherein the main body has a relatively flat radially inner wall and an opposed relatively flat radially outer wall such that the inner wall and the outer wall define respective diameters of the second annular sealing element, and a third annular sealing element disposed immediately adjacent to the second end region of the first intermediate sealing element, wherein the third sealing element has a first end region disposed immediately adjacent to the second end region of the first intermediate sealing element and an opposed second end region, wherein the first end region of the third sealing element has a shape that is complementary to the shape of the recess formed in the second end region of the first intermediate sealing element and directly contacts an inner surface of the recess, and wherein the second end region directly contacts a wall of the groove, wherein the recess of the first intermediate sealing element includes a first substantially circular portion, and wherein the first end region of the third annular sealing element, when mounted within the recess of the first annular intermediate sealing element, forms a frictional fit from the direct contact of the entire first end region of third sealing element with the circular portion of the recess of the intermediate sealing element, so as to be able to prevent the first and second flared leg portions of the first annular intermediate sealing element from collapsing during a negative pressure condition.

2. The sealing assembly of claim 1, wherein each of the first and second slanted wall surfaces of the first end region of the first intermediate sealing element have an angle of about 45 degrees relative to the relatively flat, non-sloped inner and outer surfaces.

3. The sealing assembly of claim 1, wherein each of the first and second flared leg portions of the first intermediate sealing element has a sealing edge associated therewith, wherein the width of the first intermediate sealing element as measured at the rib and at the sealing edges of the first and second flared leg portions is greater than a width of each of the second and third sealing elements.

4. The sealing assembly of claim 3, wherein each of the sealing edges has a slanted surface associated therewith.

5. The sealing assembly of claim 4, wherein each of the slanted surfaces forms an angle relative to the end plane of about 10 degrees.

6. The sealing assembly of claim 4, wherein each of the slanted surfaces forms an angle relative to the end plane.

7. The sealing assembly of claim 1, wherein the recess further comprises a second axially outer portion adjacent to an entrance to the recess that has generally flat opposed axially extending first and second wall portions.

8. The sealing assembly of claim 1, wherein the first end region of the third sealing element has a substantially circular shape and the second end region has a stem-like shape having opposed first and second axially extending wall surfaces.

9. The sealing assembly of claim 8, wherein the recess of the first intermediate sealing element comprises the first substantially circular portion and a second axially outer portion adjacent to an entrance to the recess that has generally flat opposed axially extending first and second wall portions, wherein the first substantially circular region of the recess is complementary in shape to and directly contacts the entire substantially circular first end region of the third sealing element and the second axially outer portion of the recess is complementary in shape to at least a portion of the second end region of the third sealing element.

10. The sealing assembly of claim 1, wherein the recess of the second end region of the second sealing element includes opposed first and second slanted wall portions and a relatively flat floor, wherein when assembled the flat end surface of the first intermediate sealing element contacts the floor of the recess of the second sealing element and the first and second slanted wall surfaces of the first intermediate sealing element contact, respectively, the first and second slanted wall portions of the second sealing element.

11. The sealing assembly of claim 1, wherein each of the sealing elements has a hardness value associated therewith, and wherein the hardness values of the sealing elements differ relative to each other.

12. The sealing assembly of claim 1, wherein the first intermediate sealing element has a first hardness value associated therewith, the second sealing element has a second hardness value associated therewith, and the third sealing element has a third hardness value associated therewith, wherein the first, second and third hardness values differ relative to each other, and wherein the hardness values of the sealing elements decrease in an axial direction from the second sealing element to the third sealing element.

13. The sealing assembly of claim 1, wherein the sealing assembly has a first length and the groove of the gland has a second length, wherein the first length is greater than the second length.

14. The sealing assembly of claim 1, wherein the first slanted wall surface of the first end region of the first annular intermediate sealing element has a first length, and the second slanted wall surface of the first end portion has a second length, wherein the first length is less than the second length.

\* \* \* \* \*